(12) United States Patent
Yu et al.

(10) Patent No.: US 9,549,177 B2
(45) Date of Patent: Jan. 17, 2017

(54) EVALUATION OF SIGNALING OF COLLOCATED REFERENCE PICTURE FOR TEMPORAL PREDICTION

(71) Applicant: Google Technology Holdings LLC, Mountain View, CA (US)

(72) Inventors: Yue Yu, San Diego, CA (US); Jian Lou, San Diego, CA (US); Limin Wang, San Diego, CA (US)

(73) Assignee: GOOGLE TECHNOLOGY HOLDINGS LLC, Mountain View, CA (US)

(*) Notice: Subject to any disclaimer, the term of this patent is extended or adjusted under 35 U.S.C. 154(b) by 412 days.

(21) Appl. No.: 13/766,676

(22) Filed: Feb. 13, 2013

(65) Prior Publication Data

US 2013/0272375 A1 Oct. 17, 2013

Related U.S. Application Data

(60) Provisional application No. 61/623,036, filed on Apr. 11, 2012.

(51) Int. Cl.
*H04N 7/26* (2006.01)
*H04N 19/137* (2014.01)
(Continued)

(52) U.S. Cl.
CPC ...... *H04N 19/00145* (2013.01); *H04N 19/137* (2014.11); *H04N 19/463* (2014.11);
(Continued)

(58) Field of Classification Search
None
See application file for complete search history.

(56) References Cited

U.S. PATENT DOCUMENTS

2003/0058238 A1 3/2003 Doak et al.
2003/0107815 A1 6/2003 Redmond
(Continued)

FOREIGN PATENT DOCUMENTS

EP 1422946 5/2004
WO WO2011050641 5/2011

OTHER PUBLICATIONS

Bross B et al.: "WD4: Working Draft 4 of High-Efficiency Video Coding", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL:http://wftp3.itu.int/av-arch/jctvc-site/, No. JCTVC-F803, Sep. 8, 2011, all pages.

(Continued)

*Primary Examiner* — Frederick Bailey
(74) *Attorney, Agent, or Firm* — Young Basile Hanlon & MacFarlane, P.C.

(57) ABSTRACT

A method determines a value for a first flag that controls whether a temporal motion vector is used for a slice. If the value of the first flag is a first value, the method performs: evaluating a first condition to determine whether to encode or decode a second flag; if the first condition indicates the second flag should be used, encoding or decoding the second flag in encoding or decoding the slice; evaluating a second condition to determine whether to encode or decode position information that indicates a position that contains the collocated reference picture; and if the second condition indicates the position information should be used, encoding or decoding the position information in encoding or decoding the slice. If the first flag is a second value, the method does not encode or decode the second flag and the position information.

20 Claims, 8 Drawing Sheets

(51) Int. Cl.
   *H04N 19/52*   (2014.01)
   *H04N 19/70*   (2014.01)
   *H04N 19/463*  (2014.01)
   *H04N 19/577*  (2014.01)

(52) U.S. Cl.
   CPC .......... *H04N 19/52* (2014.11); *H04N 19/577* (2014.11); *H04N 19/70* (2014.11)

(56) References Cited

U.S. PATENT DOCUMENTS

| | | |
|---|---|---|
| 2005/0013365 A1 | 1/2005 | Mukerjee et al. |
| 2005/0046702 A1 | 3/2005 | Katayama et al. |
| 2005/0053137 A1 | 3/2005 | Holcomb |
| 2005/0117646 A1 | 6/2005 | Joch et al. |
| 2005/0152452 A1 | 7/2005 | Suzuki |
| 2005/0232356 A1 | 10/2005 | Gomi et al. |
| 2005/0276448 A1 | 12/2005 | Pryor |
| 2006/0104349 A1 | 5/2006 | Joch et al. |
| 2006/0219857 A1 | 10/2006 | Satterfield |
| 2006/0233252 A1 | 10/2006 | Bhattacharya et al. |
| 2007/0063997 A1 | 3/2007 | Scherer et al. |
| 2007/0286281 A1 | 12/2007 | Tsuchiya et al. |
| 2008/0136923 A1 | 6/2008 | Inbar et al. |
| 2008/0267290 A1 | 10/2008 | Barbieri et al. |
| 2009/0003446 A1 | 1/2009 | Wu et al. |
| 2009/0021588 A1 | 1/2009 | Border et al. |
| 2009/0080535 A1 | 3/2009 | Yin et al. |
| 2009/0087111 A1 | 4/2009 | Noda et al. |
| 2009/0129472 A1 | 5/2009 | Panusopone et al. |
| 2009/0168886 A1 | 7/2009 | Ikeda et al. |
| 2010/0111182 A1 | 5/2010 | Karczewicz et al. |
| 2010/0128995 A1 | 5/2010 | Drugeon et al. |
| 2011/0002389 A1 | 1/2011 | Xu et al. |
| 2011/0110428 A1 | 5/2011 | Chang et al. |
| 2011/0228852 A1 | 9/2011 | Budagavi |
| 2012/0082229 A1* | 4/2012 | Su et al. .................. 375/240.16 |
| 2012/0236942 A1* | 9/2012 | Lin et al. .................. 375/240.16 |
| 2012/0250773 A1* | 10/2012 | Chien et al. ............. 375/240.26 |
| 2013/0128967 A1 | 5/2013 | Yu et al. |
| 2013/0128969 A1 | 5/2013 | Yu et al. |
| 2013/0128970 A1 | 5/2013 | Yu et al. |
| 2013/0128977 A1 | 5/2013 | Yu et al. |
| 2013/0163663 A1 | 6/2013 | Yu et al. |
| 2013/0182769 A1 | 7/2013 | Yu et al. |
| 2013/0188697 A1* | 7/2013 | Ye .................... H04N 19/00575 375/240.12 |
| 2013/0202034 A1 | 8/2013 | Yu et al. |
| 2013/0243092 A1* | 9/2013 | Sugio ............... H04N 19/00696 375/240.16 |
| 2013/0272406 A1 | 10/2013 | Yu et al. |
| 2014/0023142 A1 | 1/2014 | Yu et al. |
| 2014/0056356 A1 | 2/2014 | Yu et al. |

OTHER PUBLICATIONS

Bross, Benjamin et al.: "High Efficiency Video Coding (HEVC) text specification draft 7," Joint Collaborative Team on Video Coding (JCT-VC) of ISO/IEC JTC1/SC29/WG11 and ITU-T SG16 WP3, 9th Meeting : Geneva, CH, Apr. 27-May 7, 2012, JCTVC-I1003_d9, 278 pages.

Byeong-Moon Jeon. Alexis Michael Tourapis:"B pictures in JVT" 4. JVT Meeting; 61.MPEG Meeting; Jul. 22, 2002-Jul. 26, 2002; Klagenfurt. AT; (Joint Video Team of ISO/IEC JTC1/SC29/WG11 and ITU-T SG.16 ), No. JVT-DI55. Jul. 26, 2002, PX030005418.

Fang S et al.: "The Construction of Combined List for HEVC",6. JCT-VC Meeting; 97. MPEG Meeting; Jul. 14, 2011-Jul. 22, 2011;Torino;(Joint Collaborative Team on Video Coding of ISO/IEC JTC1/SC29/WG11 and ITU-T SG.16); URL: http://wftp3.itu.int/av-arch/jctvc-site/, No. JCTVC-F573, Jul. 16, 2011.

Guillaume Laroche et al.: "On memory compression for motion vector prediction", Mar. 10, 2011, No. JCTVC0E221, all pages.

Hellman T et al.: "Limiting Collocated Temporal Reference to One Per Picture", Joint Collabortive Team on Video Coding of ISO/IEC JTC1/SC29/WG11 and ITU-T SG. 16, No. JCTVC-H0442, Jan. 20, 2012, JCT-VC Meeting; 99, MPEG Meeting; Feb. 1, 2012-Feb. 10, 2012; San Jose Retrieved from the Internet: URL:http://wftp3.itu.int/av-arch/jctvc-site/[retrieved on May 23, 2013], all pages.

I-L Kim et al.:"Restriction on motion vector scaling for Merge and AMVP", 8. JCT-VC Meeting; 98. MPEG Meeting; Nov. 21, 2011-Nov. 28, 2011; Geneva; (Joint Collaborative Team on Video Coding of ISO/IEC JTCI/SC29/WG11 and ITU-T-SG.16 );URL: http://wftp3.itu.int/av-arch/jctvc-site/, No. JCTVC-G551, Nov. 8, 2011, XP030110535.

IPRP, & Written Opinion of the International Searching Authority for International Application No. PCT/US2013054965, Feb. 15, 2015, 8 pages.

ISR and Written Opinion of the International Searching Authority for International Application No. PCTUS2012066146, Feb. 20, 2013, 15 pages.

ISR & Written Opinion Re: application PCTUS2012070871 dated Mar. 19, 2013, 15 pages.

ISR and Written Opinion of the International Searching Authority for International Application No. PCTUS2012065850, Feb. 27, 2013, 17 pages.

ISR, ISR Search Report and Written Opinion of the International Searching Authority for International Application No. ISR/US2013055968 dated Nov. 22, 2013 , 9 pages.

ISR, & Written Opinion of the International Searching Authority fo International Application No. ISR/US2012/065699, Jan. 25, 16 pages.

ISR, & Written Opinion of the International Searching Authority for International Application No. ISR/US2013024294, Jul. 3, 2013, 13 pages.

ISR, & Written Opinion of the International Searching Authority for International Application No. ISR/US2013025988, May 14, 2013, 11 pages.

ISR, & Written Opinion of the International Searching Authority for International Application No. ISR/US2013054965, Oct. 22, 2013, 12 pages.

Jian-Liang Lin et al.:"Motion vector coding techniques for HEVC", Multimedia Signal Processing (MMSP), 2011 IEE 13th International Workshop on. IEEE Oct. 17, 2011. pp. 1-6, XP03202755.

J-L Lin et al.:"Improved Advanced Motion Vector Prediction", 4. JCT-VC Meeting; 95. MPEG Meeting; Jan. 20, 2011-Jan. 28, 2011;Daegu;(Joint Collaborative Team on Video Coding of ISO/IEC JTC1/SC29/WG11 and ITU-T SG.16); URL:http://wftp3.itu.int/av-arch/jctvc-site/, No. JCTVC-D125. Jan. 15, 2011 XP030008165.

Jung J et al.: Temporal MV predictor modification for MV-Comp, Skip Direct and Merge schemes, 4. JCT-VC Meeting; 95, MPEG Meeting; Jan. 20, 2011-Jan. 28, 2011; Daegu; (Joint Collaborative Team on Video Coding of ISO/IEC JCT1/SC29/WG11 and ITU-T SG16); URL; http://wftp3.itu.int/av-arch/jctvc-site/, No. JCTVC-D164, Jan. 15, 2011, all pages.

Kadono: "Memory Reduction for Temporal Direct Mode", 5, JVT Meeting; Oct. 14, 2002-Oct. 18, 2002; Geneva, CH; (Joint Video Team of ISC/IEC JTC1/SC29/WG11 and ITU-T SG16), No. JVT-E076, Oct. 18, 2002, all pages.

Li et al., "Redundancy reduction in B-frame coding at temporal level zero" Joint Collaborative Team on Video Coding (JCT-VC) of ITU-T SG16 WP3 and ISO/IEC JTC1/SC29/WG11; 3rd Meeting: Guangzhou, CN; Oct. 7-15, 2010; 6 pages.

Lim C S et al.: "High-level Syntax: Proposed fix on signalling of TMVP disabling flag", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-10420, Apr. 17, 2012, all pages.

Bordes et al.: "AHG9: Simplification of weighted prediction signaling in PPS," 10. JCT-VC Meeting; 101. Mpeg Meeting; Jul. 11, 2012-Jul. 20, 2012; Stockholm; (Joint Collaborative Team on Video Coding of ISO/IEC JTC1/SC29/WG11 and ITU-T SG16); URL: http://wftp3.itu.int/av-arch/jctvc-site/. No. JCTVC-J0504, Jul. 12, 2012, all pages.

(56) References Cited

OTHER PUBLICATIONS

Sjaberg R et al.: Absolute signaling of reference pictures, 6. JCT-VC Meeting; 97. MPEG Meeting; Jul. 14, 2011-Jul. 22, 2011; Torino;(Joint Collaborative Team on Video Coding of ISO/IEC JTCI/SG29/WG11 and ITU-T SG.16);URL:http://wftp3.itu.int/av-arch/jctvc-site/, No. JCTVC-F493. Jul. 22, 2011 XP030009516.

Suzuki et al., "Extension of uni-prediction simplification in B slices" Joint Collaborative Team on Video Coding (JCT-VC) of ITU-T SG16 WP3 and ISO/IEC JTC1/SC29/WG11; 4th Meeting: Daegu. Lorea; JCTVC-D421 Jan. 20-28, 2011; 8 pages.

Toshiyasu Sugio et al.: CE9: Experiment A, I, J and S Modified derivation processof reference index for skip mode and temporal motion vector predictor, Mar. 18, 2011, No. JCTVC-E230, Mar. 18, 2011.

W-S Kim et al.: "Non-CE8: Method of visual coding artifact removal for SAO"> 7. JCT-VC Meeting; 98. MPEG Meeting; Nov. 21, 2011-Nov. 30, 2011; Geneva; (Joint Collaborative Team on Video Coding of ISO-IEC JTC1/SC29/WG11 and ITU-T SG.16),, URL: http://wftp3.itu.int/av-arch/jctvc-site/,, No. JCTVC-G680, Nov. 9, 2011, all pages.

Y-K Wang et al.: AHG15: On sequence parameter set and picture parameter set, 7, JCT-VC Meeting; 98, MPEG Meeting; Nov. 21, 2011-Nov. 20, 2011; Geneva; (Joint Collaborative Team on Video Coding of ISO/IEC JTC1/SC29/WG11 and ITU-T SG16); URL: http://wftp3.itu.int/av-arch/jctvc-site/, No. JCTVC-G334, Nov. 9, 2011, all pages.

Yue Yu et al.: "Implicit Signaling of collocated picture for HEVC", 99.MPEG Meeting; Feb. 6, 2012-Feb. 18, 2012; San Josa CR; (Motion Picture Expert Group or ISO/IEC JTCI/SC29/WG11), No. m23429, Jun. 7, 2012 XP030051954.

Yue Yu et al.: "Modification of slice temporal mvp enable flag", 11. JCT-VC Meeting; 102. MPEG Meeting; Oct. 10, 2012-Oct. 19, 2012; Shanghai; (Joint Collaborative Team on Video Coding of ISO/IEC JTC1/SC29/WG11 and ITU-T SG.16); URL:http://wftp3.itu.int/av-arch/jctvc-site/,, No. JCTVC-K0251, Oct. 2, 2012, all pages.

Yue Yu et al.: "Modifications on signalling collocated picture", 9. JCT-VC Meeting; 188. MPEG Meeting; Apr. 27, 2012-May 7, 2012; Geneva; (Joint Collaborative Team on Video Coding of ISO/IEC JTCI/SC29/WG11 and ITU-T SG.16);URL:http://wftp3.itu.int/av-arch/jctvc-site/, No. JCTVC-I0266. Apr. 17, 2012 XP030112029.

Yue Yu et al.: "The Reference Picture Construction of Combined List for HEVC",7. JCT-VC Meeting; 98. MPEG Meeting; Nov. 21, 2011-Nov. 30, 2011;Geneva;(Joint Collaborative Team on Video Coding of ISO/IEC JTC1/SC29/WG11 and ITU-T SG.16); URL:http://wftp3.itu.int/av-arch/jctvc-site/, No. JCT-G717, Nov. 10, 2011.

Yue Yu.: "AHG21: The Improvements on Reference Picture Buffering and List Construction", Joint Collaborative Team on Video Coding of ISO/IEC JTC1/SC29/WG11 and ITU-T SG.16, no. Nov. 2011, JCT-VC Meeting; Nov. 21, 2011-Nov. 30, 2011 Geneva; 98, MPEG Meeting retrieved from the Internet: URL:http://wftp3.itu.int/av-arch/jctvc-site/2011_11_g_geneva/[retrieved on May 23, 2013], all pages.

Yue Yuet al.: "Simplification of MVP Design for HEVC",6. JCT-VC Meeting; 97. MPEG Meeting; Jul. 14, 2011-Jul. 22, 2011; Torino;(Joint Collaborative Team on Video Coding of ISO/IEC JTC1/SC29/WG11 and ITU-T SG.16); URL:http://wftp3.itu.int/av-arch/jctvc-site/, No. JCTVC-F575. Jul. 19, 2011 XP03009598.

Li (USTC) B et al: "Constrained temporal motion vector prediction for error resillience", 4. JCT-VC Meeting; 95. MPEG Meeting; Jan. 20, 2011-Jan. 28, 2011; Daegu; (Joint Collaborative Team on Video Coding of ISO/IEC JTC1/SC29/WT11 and ITU-T SG.16); URL:http://wftp3.itu.int/av-arch/jctvc-site/,, No. JCTVC-D139, Jan. 15, 2011, all pages.

J-L Lin et al.: "Syntax for AMVP Parsing Error Control", 95. MPEG Meeting; Jan. 24, 2011-Jan. 28, 2011; Daegu; (Motion Picture Expert Group or ISO/IEC JTC1/SC29/WG11),, No. m18878, Jan. 23, 2011, all pages.

Li (USTC) B et al.: "High-level Syntax: Marking process for non-TMVP pictures", 7. JCT-VC Meeting; 98. MPEG Meeting; Nov. 21, 2011-Nov. 30, 2011; Geneva; (Joint Collavorative Team on Video Coding of ISO/IEC JTC1/SC29/WG11 and ITU-T SG.16); URL: http://wftp3.itu.int/av-arch/jctvc-site/,, No. Jctv-G398, Nov. 8, 2011, all pages.

Wahadaniah V et al.: "AHG14/AHG15/non-CE9: :Loss robustness issue in TMVP disabling", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL:http://wftp3.itu.int/av-arch/jctvc-site/,, No. JCTVC-H0570, Jan. 21, 2012, all pages.

Bross B et al.: "High Efficiency Video Coding (HEVC) text specification draft 6", 8. JCT-VC Meeting; 99. MPEG Meeting; Feb. 1, 2012-Feb. 10, 2012; San Jose; (Joint Collaborative Team on Video Coding of ISO/IEC JTC1/SC29/WG11 and ITU-T SG.16); URL:http://wgtp3.itu.int/av-arch/jctvc-site/,,No. JCTVC-H1003, Feb. 10, 2012, all pages.

Patent Cooperation Treaty, International Search Report and Written Opinion of the International Searching Authority for International Application No. PCT/US2013/025994, May 15, 2013, 12 pages.

Bross, et al., "High efficiency video coding (HEVC) text specification draft 6", JCTVC-H1003, Feb. 1-10, 2012.

Bankoski et al. "Technical Overview of VP8, an Open Source Video Codec for the Web". Dated Jul. 11, 2011.

Bankoski et al. "VP8 Data Format and Decoding Guide" Independent Submission. RFC 6389, Dated Nov. 2011.

Bankoski et al. "VP8 Data Format and Decoding Guide; draft-bankoski-vp8-bitstream-02" Network Working Group. Internet—Draft, May 18, 2011, 288 pp.

Bin Li et al., "Redundancy Reduction in B-Frame Coding at Temporal Level Zero," JCTVC-C278, Oct. 7, 2010, 6 pages.

Bross B et al.: "High Efficiency Video (HEVC) text specification Working Draft 5", 7. JCT-VC Meeting; 98, MPEG Meeting; Nov. 21, 2011-Nov. 30, 2011; Geneva; (Joint Collaborative Team on Video Coding of ISO/IEC JTC1/SC29/WG11 and ITU-T SG. 16); URL:http://wftp3.itu.int/av-arch/jctvc-site/, No. JCTVC-G1103, Dec. 19, 2011, all pages.

Ericsson, "Absolute signaling of reference pictures," JCTVC-F493 WG11 No. m20923, JCT-VC of ITU-T SG16 WP3 and ISO/IEC JTC1/SC29/WG11, 6th (JCTVCF493) Meeting: Torino (2011) 16 pages.

Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.

Korean Office Action dated Aug. 12, 2015 in related matter. 11 pages.KR10-214-7013280, 17 pages.

Motorola Mobility, "The Construction of Combined List for HEVC," JCTVC-F573-r2, JCT-VC of ITU-T SG16 WP3 and ISO/IEC JTC1/SC29/WG11, 6th (JCTVCF573) Meeting: Torino, IT (Jul. 14-22, 2011) 6 pages.

Mozilla, "Introduction to Video Coding Part 1: Transform Coding", Video Compression Overview, Mar. 2012, 171 pp.

Office Action in a related matter. Korean Patent Application No. 10-2014-7017195, mailed Jul. 30, 2015 citing new art. 7 pages.

Overview; VP7 Data Format and Decoder. Version 1.5. On2 Technologies, Inc. Dated Mar. 28, 2005.

Samsung Electronics Co., Ltd., "Restriction on motion vector scaling for Merge and AMVP," JCTVC-G551, JCT-VC of ITU-T SG16 WP3 and ISO/IEC JTC1/SC29/WG11, 7th (JCTVCG551) Meeting: Geneva, CH (Nov. 21-30, 2011) 4 pages.

Series H: Audiovisual and Multimedia Systems; Infrastructure of audiovisual services—Coding of moving video. H.264. Advanced video coding for generic audiovisual services. International Telecommunication Union. Version 11. Dated Mar. 2009.

Series H: Audiovisual and Multimedia Systems; Infrastructure of audiovisual services—Coding of moving video. H.264. Advanced video coding for generic audiovisual services. International Telecommunication Union. Version 12. Dated Mar. 2010.

Series H: Audiovisual and Multimedia Systems; Infrastructure of audiovisual services—Coding of moving video. H.264. Amendment (56) References Cited

OTHER PUBLICATIONS

2: New profiles for professional applications. International Telecommunication Union. Dated Apr. 2007.
Series H: Audiovisual and Multimedia Systems; Infrastructure of audiovisual services—Coding of moving video. H.264. Advanced video coding for generic audiovisual services. Version 8. International Telecommunication Union. Dated Nov. 1, 2007.
Series H: Audiovisual and Multimedia Systems; Infrastructure of audiovisual services—Coding of moving video; Advanced video coding for generic audiovisual services. H.264. Amendment 1: Support of additional colour spaces and removal of the High 4:4:4 Profile. International Telecommunication Union. Dated Jun. 2006.
Series H: Audiovisual and Multimedia Systems; Infrastructure of audiovisual services—Coding of moving video; Advanced video coding for generic audiovisual services. H.264. Version 1. International Telecommunication Union. Dated May 2003.
Series H: Audiovisual and Multimedia Systems; Infrastructure of audiovisual services—Coding of moving video; Advanced video coding for generic audiovisual services. H.264. Version 3. International Telecommunication Union. Dated Mar. 2005.
VP6 Bitstream & Decoder Specification. Version 1.02. On2 Technologies, Inc. Dated Aug. 17, 2006.
VP6 Bitstream & Decoder Specification. Version 1.03. On2 Technologies, Inc. Dated Oct. 29, 2007.
VP8 Data Format and Decoding Guide. WebM Project. Google On2. Dated: Dec. 1, 2010.

\* cited by examiner

```
502 ─ if(slice_type == B && enable_temporal_mvp_flag)
504 ─     collocated_from_l0_flag
         if(slice_type != 1 && enable_temporal_mvp_flag &&
506 ─       ((collocated_from_l0_flag &&    num_ref_idx_l0_active_minus1 > 0) ||
            (!collocated_from_l0_flag && num_ref_idx_l1_active_minus1 > 0)
508 ─     collocated_ref_idx
```

EVALUATION OF SIGNALING OF COLLOCATED REFERENCE PICTURE FOR TEMPORAL PREDICTION

CROSS REFERENCE TO RELATED APPLICATIONS

The present disclosure claims priority to U.S. Provisional App. No. 61/623,036 for "Modification for Signaling Collocated Picture for HEVC" filed Apr. 11, 2012, the contents of which is incorporated herein by reference in its entirety.

BACKGROUND

Video compression systems employ block processing for most of the compression operations. A block is a group of neighboring pixels and may be treated as one coding unit in terms of the compression operations. Theoretically, a larger coding unit is preferred to take advantage of correlation among immediate neighboring pixels. Various video compression standards, e.g., Motion Picture Expert Group (MPEG)-1, MPEG-2, and MPEG-4, use block sizes of 4×4, 8×8, and 16×16 (referred to as a macroblock (MB)).

Figure 1:
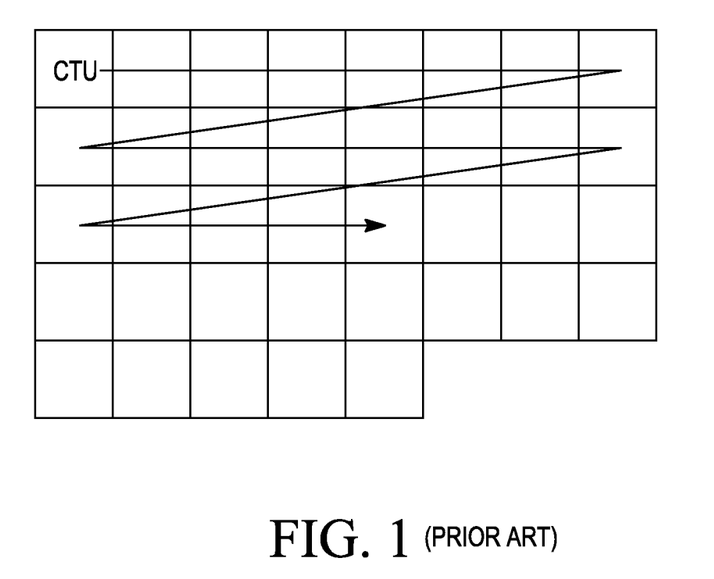
FIG. 1 shows an input picture partitioned into square blocks referred to as coding tree units (CTUs).
Figure 2:
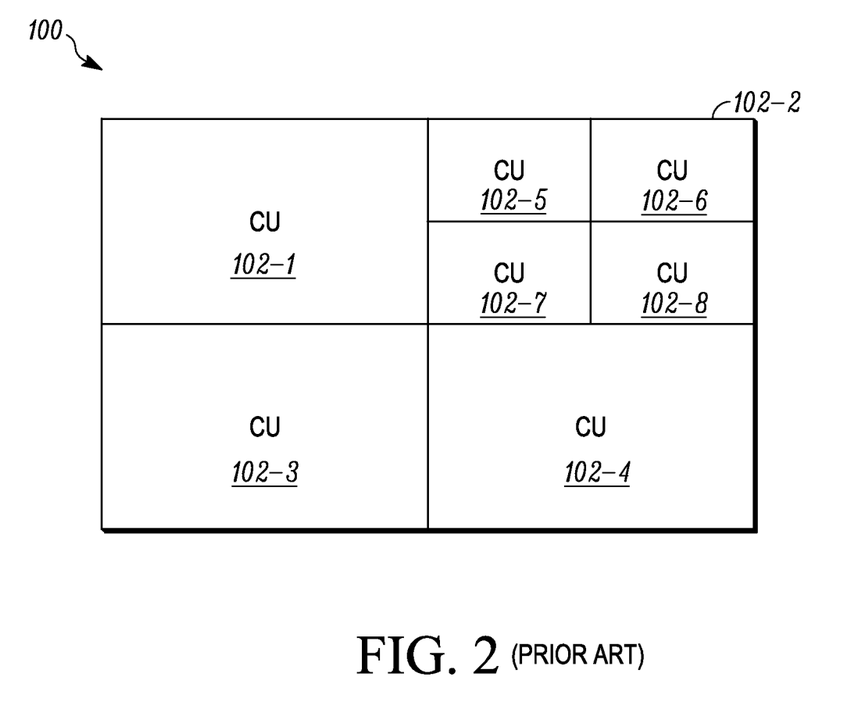
FIG. 2 shows an example of a CTU partition of CUs.

High efficiency video coding (HEVC) is also a block-based hybrid spatial and temporal predictive coding scheme. HEVC partitions an input picture into square blocks referred to as coding tree units (CTUs) as shown in FIG. 1. Unlike prior coding standards, the CTU can be as large as 128×128 pixels. Each CTU can be partitioned into smaller square blocks called coding units (CUs). FIG. 2 shows an example of a CTU partition of CUs. A CTU 100 is first partitioned into four CUs 102. Each CU 102 may also be further split into four smaller CUs 102 that are a quarter of the size of the CU 102. This partitioning process can be repeated based on certain criteria, such as limits to the number of times a CU can be partitioned may be imposed. As shown, CUs 102-1, 102-3, and 102-4 are a quarter of the size of CTU 100. Further, a CU 102-2 has been split into four CUs 102-5, 102-6, 102-7, and 102-8.

Figure 3:
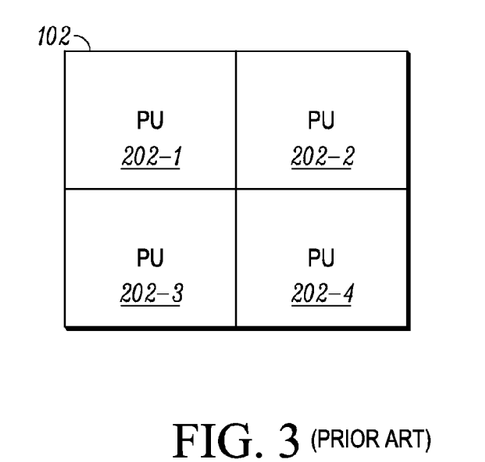
FIG. 3 shows an example of a CU partition of PUs.

Each CU 102 may include one or more blocks, which may be referred to as prediction units (PUs). FIG. 3 shows an example of a CU partition of PUs. The PUs may be used to perform spatial prediction or temporal prediction. A CU can be either spatially or temporally predictive coded. If a CU is coded in intra mode, each PU of the CU can have its own spatial prediction direction. If a CU is coded in inter mode, each PU of the CU can have its own motion vector(s) and associated reference picture(s).

In HEVC, motion vectors (MVs) are predictively coded in a spatial/temporal prediction process. For a current PU having one current motion vector and an associated reference index, a motion vector predictor (MVP) is derived from motion vectors of spatially neighboring or temporally collocated PUs of the current PU. The difference between the current motion vector and the MVP is then determined and coded. This reduces overhead as only the difference is sent instead of information for the current motion vector. Also, when in merge mode, a single motion vector may be applied to a group of spatially neighboring or temporally collocated PUs.

Given a current PU in a current picture, an associated collocated PU resides in an associated collocated reference picture. The collocated PU is used as one of the candidates for the MVP or in a merge/skip mode for the current PU. The collocated reference picture is a reference picture specified in either a list0 or a list1. A flag may be set to indicate which list the collocated PU should be defined from. For example, the flag can be set to 1 to indicate that the reference picture that contains a collocated partition shall be defined from list0, otherwise the reference picture shall be defined from list1. Sending the flag incurs overhead in the encoded bitstream.

DETAILED DESCRIPTION

Described herein are techniques for a video compression system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method determines a value for a first flag that controls whether a temporal motion vector is used for a slice. If the value of the first flag is a first value, the method performs: evaluating a first condition to determine whether to encode or decode a second flag that indicates whether to use a first list containing a first list of reference pictures or a second list for determining a collocated reference picture; if the first condition indicates the second flag should be used, encoding or decoding the second flag in encoding or decoding the slice; evaluating a second condition to determine whether to encode or decode position information that indicates a position that contains the collocated reference picture in one of the first list or the second list; and if the second condition indicates the position information should be used, encoding or decoding the position information in encoding or decoding the slice. If the first flag is a second value, the method does not encode or decode the second flag and the position information in encoding or decoding the slice.

In one embodiment, a decoder includes: one or more computer processors; and a non-transitory computer-readable storage medium comprising instructions that, when executed, control the one or more computer processors to be configured for: determining an encoded bitstream; determining a value for a first flag that controls whether a temporal motion vector is used for decoding slice in the encoded bitstream; if the value of the first flag is a first value, performing: evaluating a first condition to determine whether to decode a second flag that indicates whether to decode a first list containing a first list of reference pictures or a second list containing a second list of reference pictures for determining a collocated reference picture; if the first condition indicates the second flag should be decoded, decoding the second flag in the encoded bitstream for use in decoding the slice; evaluating, by the computing device, a second condition to determine whether to decode position information that indicates a position that contains the collocated reference picture in one of the first list or the second list; and if the second condition indicates the position information should be decoded, decoding the position information in the encoded bitstream for use in decoding the slice; and if the first flag is a second value, not decoding the second flag and the position information from the encoded bitstream.

In one embodiment, an encoder includes: one or more computer processors; and a non-transitory computer-readable storage medium comprising instructions that, when executed, control the one or more computer processors to be configured for: determining a value for a first flag that controls whether a temporal motion vector is used for encoding slice; if the value of the first flag is a first value, performing: evaluating a first condition to determine whether to encode a second flag that indicates whether to use a first list containing a first list of reference pictures or a second list containing a second list of reference pictures for determining a collocated reference picture; if the first condition indicates the second flag should be encoded, encoding a value for the second flag in encoding the slice; evaluating, by the computing device, a second condition to determine whether to encode position information that indicates a position that contains the collocated reference picture in one of the first list or the second list; and if the second condition indicates the position information should be encoded, encoding the position information in the encoded bitstream in the temporal prediction process in encoding the slice; and if the first flag is a second value, not encoding the second flag and the position information for the slice.

Overview

Figure 4:
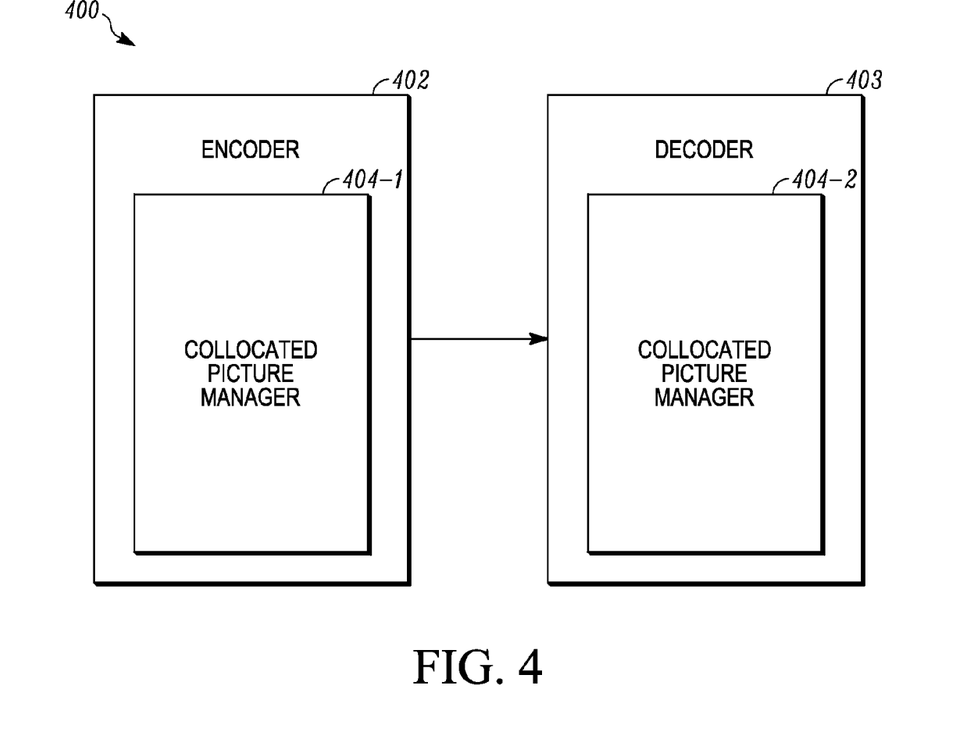
FIG. 4 depicts an example of a system for encoding and decoding video content according to one embodiment.

FIG. 4 depicts an example of a system 400 for encoding and decoding video content according to one embodiment. Encoder 402 and decoder 403 may encode and decode a bitstream using HEVC; however, other video compression standards may also be appreciated.

Encoder 402 includes a collocated reference picture manager 404-1 and decoder 403 includes a collocated reference picture manager 404-2. Collocated reference picture manager 404 determines a reference picture to use as a collocated reference picture for a current picture. The collocated reference picture includes motion vector (MV) information that can be used in a temporal prediction process. For example, a motion vector for a partition in the collocated reference picture may be used as a temporal motion vector predictor (MVP) in advanced motion vector prediction (AMVP) or as a temporal merge/skip candidate motion vector in a merge process. When the motion vector of the collocated block is used as a temporal MVP, a difference of the motion vector of the collocated block and the current motion vector of the current block is coded and sent from encoder 402 to decoder 403. When the motion vector of the collocated block is used in a merge process, the current block and the collocated block are merged and use the same motion vector of the collocated block.

The temporal MVP or temporal merge/skip candidate MV is defined as the MV of the selected collocated block, which resides in a reference picture and has the same geometrical position as a current block in the current picture. In one example, given a PU in a current picture, an associated collocated PU can reside in a preceding or subsequent PU in time. The collocated PU can be used as a candidate to enable MVP and merge/skip mode for the current PU. Like with a PU, a collocated block can be provided for a transform unit (TU), CU or a picture itself. Subsequent discussion will reference a picture, although the same could apply to any of the listed subcomponents of a picture or a slice. A slice may be one or more blocks. Each picture may have one or more slices. Additionally, a block may be referenced, which may be a PU, but may also be a TU, CU, a picture, or a slice.

A flag collocated_from_l0_flag is used to specify which list (e.g., list0 and list1) includes the collocated reference picture. For example, when the flag collocated_from_l0_flag is equal to 1, then the collocated reference picture shall be derived from list0. Otherwise, the collocated reference picture shall be derived from list 1, such as when the flag collocated_from_l0_flag is set to 0. When the flag collocated_from_l0_flag is not present in the encoded bitstream, decoder 403 may infer that the flag collocated_from_l0_flag is equal to 1 or set the flag collocated_from_l0_flag to 1.

A syntax collocated_ref_idx specifies the index for the collocated reference picture in either list0 or list1 (or a combined list). For example, the syntax collocated_ref_idx may indicate a position in list0 or list1. Depending on the value of the flag collocated_from_l0_flag, the syntax collocated_ref_idx may refer to list0 if the flag collocated_from_l0_flag is equal to 1; otherwise, the syntax collocated_ref_idx refers to list1. In one embodiment, encoder 402 explicitly signals information for the flag collocated_from_l0_flag and syntax collocated_ref_idx to decoder 403 in the encoded bitstream if certain conditions are met. However, if other conditions are met, encoder 402 may not explicitly signal information for the flag collocated_from_l0_flag and syntax collocated_ref_idx to decoder 403 in the encoded bitstream, which saves bits and reduces overhead. The conditions will be described in more detail below.

A flag, referred to as enable_temporal_mvp_flag, is used to control whether the temporal motion vector is used or not in encoding (or decoding) a current block (or current slice or picture). For example, if the flag enable_temporal_mvp_flag is enabled (e.g., equal to 1), then temporal motion vector predictors may be used to encode (or decode) a current block (or blocks in a slice or picture). When a temporal MVP is used, a motion vector from a collocated block may be included in a group of candidate motion vectors, which may also include motion vectors from spatially located blocks. A motion vector is selected from the candidate group to use in encoding or decoding the current block. Otherwise, if the flag enable_temporal_mvp_flag is not enabled (e.g., equal to 0), temporal motion vector predictors are not used in encoding (or decoding) a current block (or slice of blocks/pictures). The flag enable_temporal_mvp_flag may be set for a slice, picture, series of pictures, or a single block. For example, when the flag enable_temporal_mvp_flag is set for a slice, the flag applies to all blocks being encoded/decoded within the slice.

In one embodiment, if the flag enable_temporal_mvp_flag is equal to 0, syntax elements related to the collocated reference picture can be ignored. This is because temporal motion vector predictors are not going to be used for encoding or decoding any blocks that are associated with the flag enable_temporal_mvp_flag, such as blocks in a slice or blocks in pictures that are associated with the enable_temporal_mvp_flag. Thus, in one embodiment, the syntax elements of the flag collocated_from_l0_flag and the syntax collocated_ref_idx are not needed. In this case, encoder 402 may not encode any information for the flag collocated_from_l0_flag and the syntax collocated_ref_idx in the encoded bitstream. Further, decoder 403 does not look to decode any information for the flag collocated_from_l0_flag and the syntax collocated_ref_idx in the encoded bitstream when collocated reference picture manager 404-2 detects that the flag enable_temporal_mvp_flag is 0. Conventionally, even if the flag enable_temporal_mvp_flag is 0, decoder 403 would decode information for the flag collocated_from_l0_flag and the syntax collocated_ref_idx.

Figure 5:
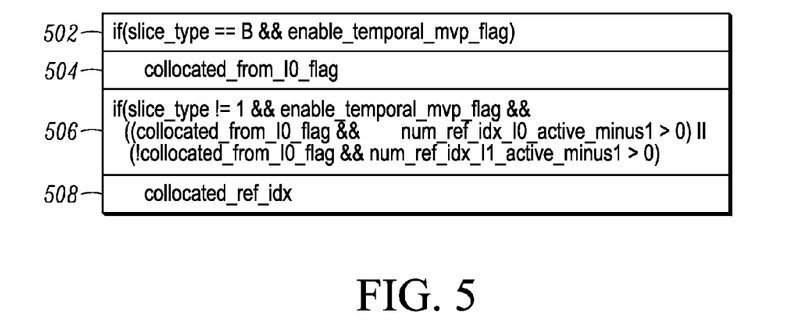
FIG. 5 shows an example of a syntax for evaluating whether to use the flag collocated_from_l0_flag and the syntax collocated_ref_idx according to one embodiment.

Particular embodiments may use a syntax to evaluate conditions to determine whether to use the flag collocated_from_l0_flag and the syntax collocated_ref_idx. FIG. 5 shows an example of a syntax 500 for evaluating whether to use the flag collocated_from_l0_flag and the syntax collocated_ref_idx according to one embodiment. At 502, a syntax tests whether to use a flag collocated_from_l0_flag that is shown at 504. The syntax tests whether a prediction type (e.g., the syntax slice_type) is equal to a B type and the flag enable_temporal_mvp_flag is enabled, such as equal to "1". In this case, the prediction type is a slice type. The value of "1" may indicate that temporal motion vectors should be used. Although the value of "1" is described, other values may be used. The syntax slice_type may be the prediction type assigned to a series of blocks (e.g., a slice) in a picture. Although a slice type is described, the syntax slice_type may refer to a prediction type for a block, a picture, or a series of pictures.

The syntax slice_type for a slice of blocks in a picture may be a prediction type for a slice (e.g., slice type) of an I type, a P type, or a B type. An I slice only uses intra-prediction and does not use temporal MVPs. The I slice only includes blocks that use intra prediction. Also, a P slice may include both I type blocks and P type blocks. Blocks in a P slice only use one motion vector. A B slice may include B, P, and I type blocks. A B type block may use two motion vectors. Thus, the syntax at 502 tests whether the syntax slice_type is a B type, which means some blocks in the slice may use one of list0 and list1 to determine the collocated reference picture. In this case, encoder 402 may need to signal which list to use the flag collocated_from_l0_flag. Additionally, the syntax at 502 tests whether the flag enable_temporal_mvp_flag has been enabled (e.g., is set to 1). When both of these conditions are true, then encoder 402 may encode a value for the flag collocated_from_l0_flag in the encoded bitstream. For example, encoder 402 may set the flag collocated_from_l0_flag to a value to indicate which list of list0 or list1 is used. Further, decoder 403 may decode the flag collocated_from_l0_flag in the encoded bitstream to determine which list of list0 and list1 to use when decoding a current block.

In the syntax at 502, the flag collocated_from_l0_flag is only set when the flag collocated_from_l0_flag is needed. That is, if the slice_type is an I type or a P type, then blocks in the slice will either not use a collocated reference picture (e.g., I type) or will use a collocated reference picture from only list0 (e.g., P type). When the predication type is P type, and the flag collocated_from_l0_flag is not included in the encoded bitstream, decoder 403 assumes the value of flag collocated_from_l0_flag is 1 and may set the value of the flag collocated_from_l0_flag to 1 by default. Additionally, when the flag enable_temporal_mvp_flag is not enabled, which means a temporal MVP is not used, then a flag indicating which list of list0 and list1 to use is not needed because decoder 403 will not need to determine a reference picture from list0 or list1 due to a temporal MVP not being used.

At 506, a syntax tests whether to use a syntax collocated_ref_idx that is shown at 508. In the syntax at 506, collocated reference picture manager 404 determines if the syntax slice_type associated with a current block is not equal to an I type (i.e., the syntax slice_type is equal to a B type or a P type). Also, collocated reference picture manager 404 determines if the flag enable_temporal_mvp_flag is enabled (e.g., equal to 1). In the above syntax at 506, collocated reference picture manager 404 is determining whether one of list0 or list1 will be used in the encoding or decoding process. That is, if the slice_type is a P type or a B type and a temporal MVP is going to be used, then a collocated reference picture in list0 or list1 will be used. Then, collocated reference picture manager 404 determines whether the syntax collocated_ref_idx should be used to identify a reference picture in list0 or list1. For example, in either list0 or list1 (i.e., whichever one is being used based on the flag collocated_from_l0_flag), if only 1 reference picture is found in either list0 or list1, then the syntax collocated_ref_idx does not need to be used. Rather, in either list0 or list1, encoder 402 or decoder 403 knows to use the only available reference picture in either list0 or list1. However, if more than 1 reference picture is found in either list0 or list1, then particular embodiments may use the syntax collocated_ref_idx to identify the reference picture to use in either list0 or list1.

Accordingly, in one embodiment, collocated reference picture manager 404 checks whether the flag collocated_from_list0_flag is equal to 1 (e.g., list0 should be used) and whether the syntax num_ref_idx_l0_active_minus1>0 is true. This means that list0 is used and also the number of reference pictures in list0 that apply to the current block is greater than 1 (or the number of reference pictures in list0 minus 1 is >0). If this evaluates to true, then collocated reference picture manager 404 uses the syntax collocated_ref_idx. For example, encoder 402 sets the syntax collocated_ref_idx to a position in list0 and decoder 403 decodes the syntax collocated_ref_idx to determine the position in list0. As discussed above, the position identifies the reference picture to use as the collocated reference picture.

Also, collocated reference picture manager 404 determines if the flag collocated_from_l0_flag is not equal to 1 (e.g., equal to 0 and indicating that list1 should be used) and the syntax num_ref_idx_l1_active_minus1 is greater than 0. In this case, collocated reference picture manager 404 is evaluating whether list1 should be used and also if the number of reference pictures in list1 that apply to the current block is greater than 1 (or the number of reference pictures in list1 minus 1 is >0). If the above statement evaluates to true, then the syntax collocated_ref_idx is used where the syntax indicates a position in list1. For example, encoder 402 sets the syntax collocated_ref_idx to a position in list1 and decoder 403 decodes the syntax collocated_ref_idx to determine the position in list1. As discussed above, the position identifies the reference picture to use as the collocated reference picture.

Accordingly, as shown in the syntax at 506, the syntax collocated_ref_idx is used when the slice type is not equal to an I type, and whenever list0 is used and the number of references pictures in list0 is greater than 1 or when list1 is used and the number of reference pictures in list1 is greater than 1.

Figure 6:
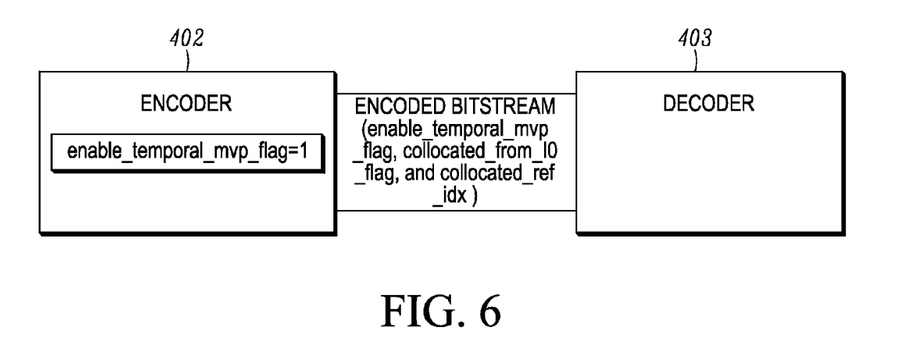
FIG. 6 depicts an example of the encoder and the decoder according to one embodiment.

FIG. 6 depicts an example of encoder 402 and decoder 403 according to one embodiment. When the flag enable_temporal_mvp_flag is enabled (equal to 1) and other conditions may apply as described above, the encoded bitstream includes the flag enable_temporal_mvp_flag, the flag collocated_from_l0_flag, and a syntax collocated_ref_idx. In this case, encoder 402 sends the encoded bitstream including flag enable_temporal_mvp_flag, the flag collocated_from_l0_flag, and syntax collocated_ref_idx to decoder 403. In one embodiment, encoder 402 sends the flag collocated_from_l0_flag and syntax collocated_ref_idx to decoder 403 in a slice header in the encoded bitstream. In other embodiments, encoder 402 sends the flag collocated_from_l0_flag and syntax collocated_ref_idx in a picture parameter set (e.g., for a series of pictures). It should be noted that this illustration is a simplification and other conditions may apply to determine whether to include the flag collocated_from_l0_flag and syntax collocated_ref_idx as was described above and also will be described below.

Figure 7:
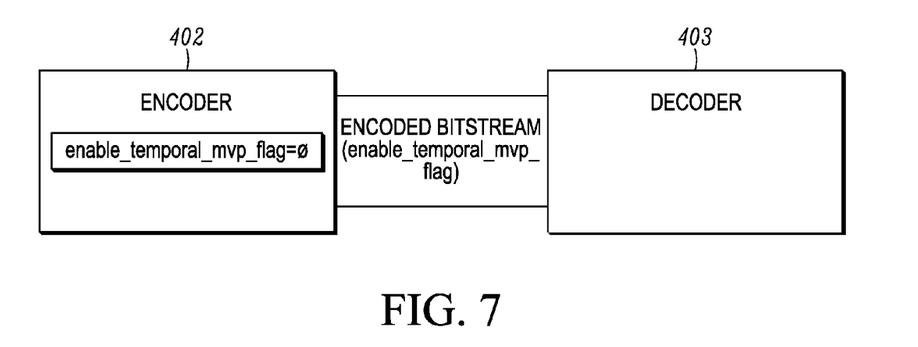
FIG. 7 shows a second example of the encoder and the decoder according to one embodiment.

FIG. 7 shows a second example of encoder 402 and decoder 403 according to one embodiment. As shown, the flag enable_temporal_mvp_flag is not enabled (equal to 0). This means that a temporal MVP will not be used in the encoding process for a current block. In this case, encoder 402 sends an encoded bitstream that includes the flag enable_temporal_mvp_flag, but not the flag collocated_from_l0_flag and the syntax collocated_ref_idx. Decoder 403 receives the encoded bitstream, determines that the flag enable_temporal_mvp_flag is not enabled and thus knows that the flag collocated_from_l0_flag and the syntax collocated syntax collocated_ref_idx are not included in the encoded bitstream and are not used to decode the current block.

Figure 8:
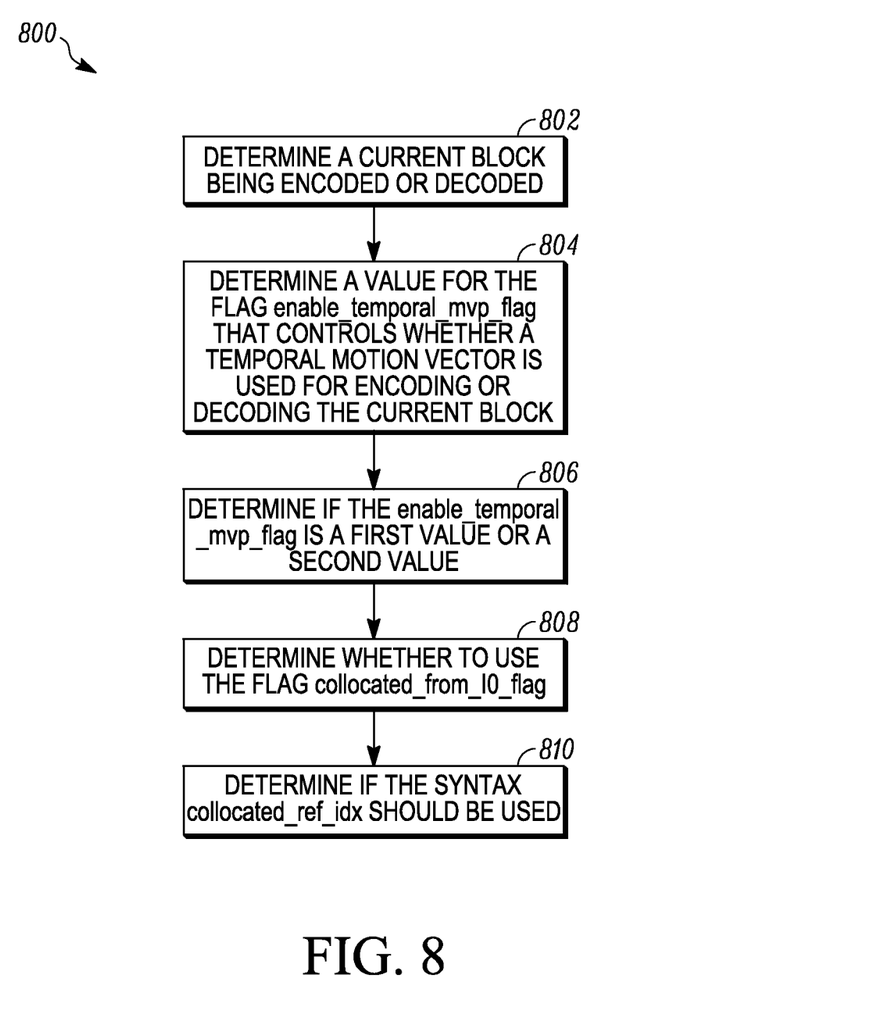
FIG. 8 depicts a simplified flowchart of a method for encoding or decoding a current block according to one embodiment.

A general method for encoding or decoding a current block will be described and then separate methods for encoding and then decoding a current block are described. FIG. 8 depicts a simplified flowchart 800 of a method for encoding or decoding a current block according to one embodiment. Although a current block is discussed, the process may be performed for multiple blocks. For example, the flag enable_temporal_mvp_flag may be associated with multiple blocks in a slice. At 802, collocated reference picture manager 404 determines a current block being encoded or decoded. For example, blocks in a current picture may be encoded or decoded.

At 804, collocated reference picture manager 404 determines a value for the flag enable_temporal_mvp_flag that controls whether a temporal motion vector is used for encoding or decoding the current block. For example, collocated reference picture manager 404 determines the value for the flag enable_temporal_mvp_flag that is associated with the current block. In one embodiment, the current block may be associated with a slice and the slice is associated with a value of the flag enable_temporal_mvp_flag.

At 806, collocated reference picture manager 404 determines if the enable_temporal_mvp_flag is a first value or a second value. The first value may be a value of 1 where the temporal motion vector is used for the current block and the second value may be a value of 0, which means that the temporal motion vector is not used for the current block.

At 808, collocated reference picture manager 404 determines whether to use the flag collocated_from_l0_flag. For example, if the flag enable_temporal_mvp_flag is equal to 0, then collocated reference picture manager 404 does not use the flag collocated_from_l0_flag. Also, if the syntax slice_type associated with the current block being encoded or decoded is a P type or I type, then the flag collocated_from_l0_flag may not be used. However, if the syntax slice_type associated with the current block being encoded or decoded is a B type and the flag enable_temporal_mvp_flag is 1, then, collocated reference picture manager 404 uses the flag collocated_from_l0_flag.

At 810, collocated reference picture manager 404 then determines if the syntax collocated_ref_idx should be used. In one embodiment, if the syntax slice_type is not equal to an I type and whichever of list0 or list1 that is being used has more than 1 reference picture in the list, then collocated reference picture manager 404 uses the syntax collocated_ref_idx.

Figure 9:
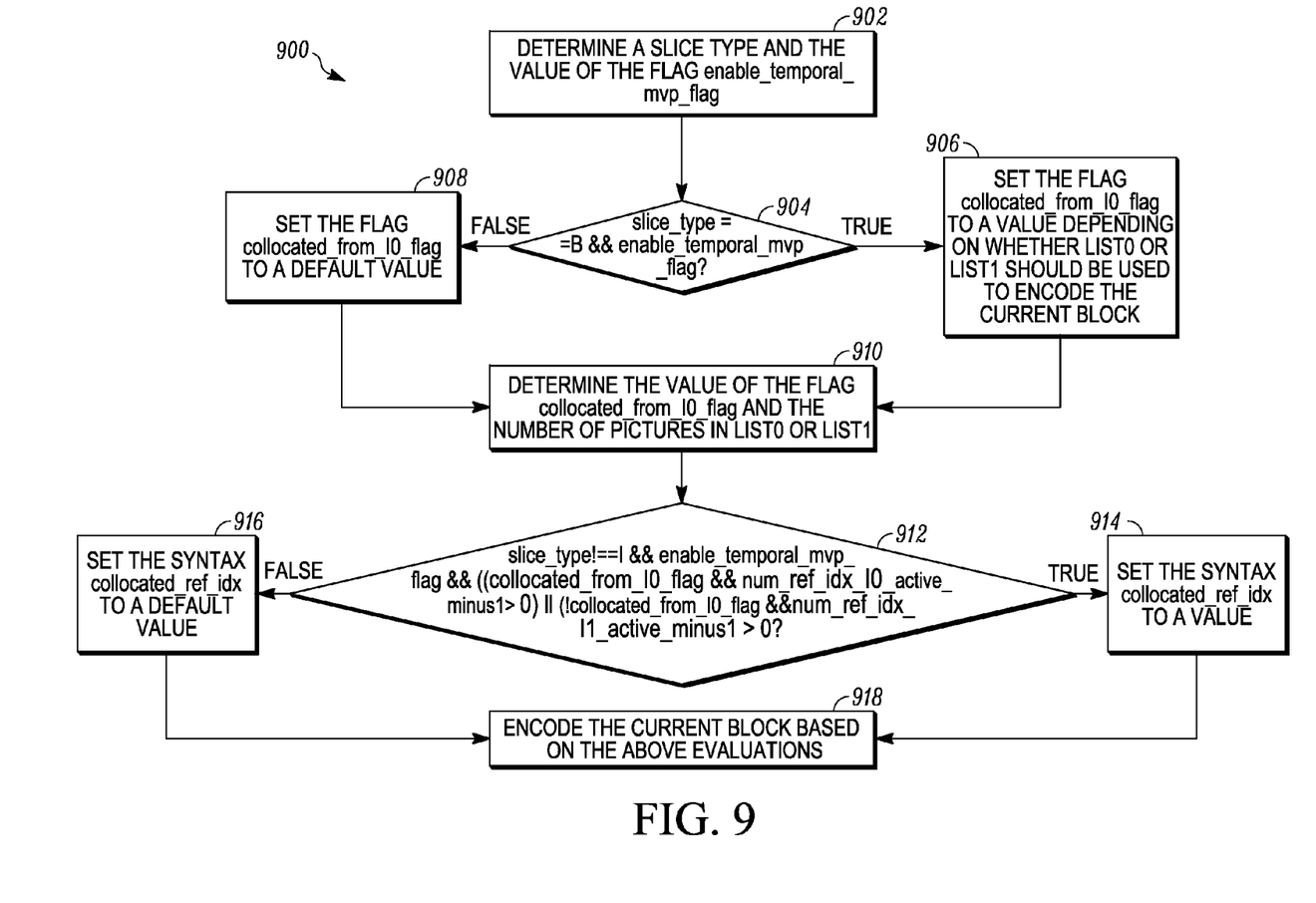
FIG. 9 depicts a more detailed flowchart of an encoding process according to one embodiment.

FIG. 9 depicts a more detailed flowchart 900 of an encoding process according to one embodiment. At 902, encoder 402 determines a slice type and the value of the flag enable_temporal_mvp_flag. At 904, encoder 402 evaluates the condition "if(slice_type==B && enable_temporal_mvp_ flag)". If this condition is true, then at 906 encoder 402 sets the flag collocated_from_l0_flag to a value depending on whether list0 or list1 should be used to encode the current block. If the condition evaluated at 904 is not true, then at 908, encoder 402 sets the flag collocated_from_l0_flag to a default value, such as 1. However, encoder 402 still may not encode the value of the flag in the encoded bitstream.

At 910, encoder 402 determines the value of the flag collocated_from_l0_flag and the number of pictures in list0 or list1. At 912, encoder 402 then evaluates the condition "if(slice_type!=I && enable_temporal_mvp_flag && ((collocated_from_l0_flag && num_ref_idx_l0_active_minus1>0)|| (!collocated_from_l0_flag && num_ref_idx_l1_active_minus1>0)". If the above condition evaluates to true, then at 914 encoder 402 sets the syntax collocated_ref_idx to a value. For example, the syntax collocated_ref_idx is set to a position in one of list0 or list1 that is being used. If the above condition does not evaluate to true, then at 916 encoder 402 sets the syntax collocated_ref_idx to a default value, such as 0. However, encoder 402 still may not encode the value of the syntax collocated_ref_idx in the encoded bitstream.

At 918, encoder 402 encodes the current block based on the above evaluations. For example, depending on the above evaluations, the flag collocated_from_l0_flag and syntax collocated_ref_idx may or may not be encoded in the bitstream with the encoded block.

Figure 10:
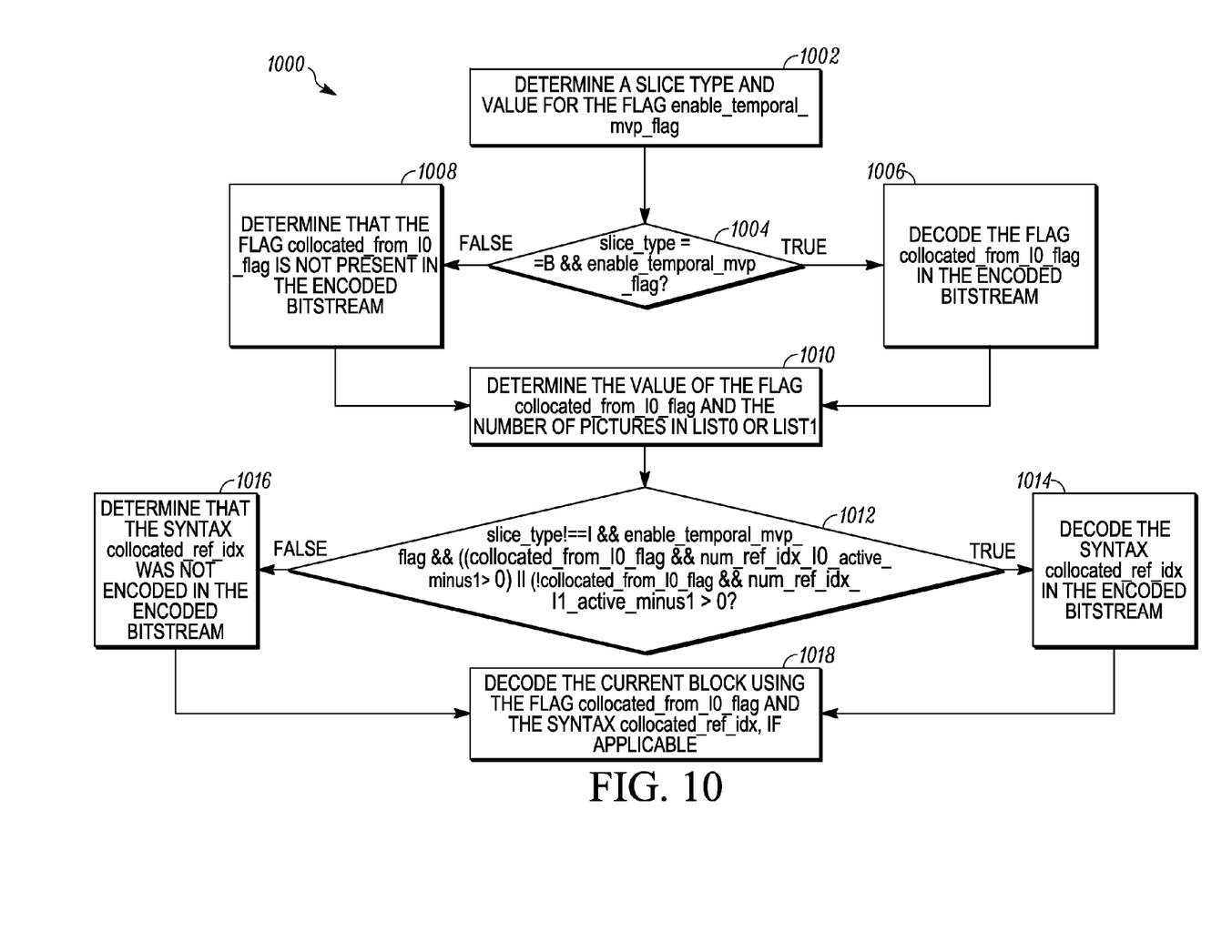
FIG. 10 depicts a simplified flowchart of a method for decoding a current block according to one embodiment.

FIG. 10 depicts a simplified flowchart 1000 of a method for decoding a current block according to one embodiment. At 1002, decoder 403 determines a slice type and value for the flag enable_temporal_mvp_flag for a current block being decoded in an encoded bitstream received from encoder 402.

At 1004, decoder 403 evaluates a first condition "if (slice_type==B && enable_temporal_mvp_flag)". If the first condition evaluates to true, then at 1006 decoder 403 decodes the flag collocated_from_l0_flag in the encoded bitstream. If the above condition does not evaluate to true, then at 1008 decoder 403 determines that the flag collocated_from_l0_flag is not present in the encoded bitstream. In this case, decoder 403 may set the flag collocated_from_l0_flag to a default value, such as 1, or may not use the flag collocated_from_l0_flag.

At 1010, decoder 403 determines the value of the flag collocated_from_l0_flag and the number of pictures in list0 or list1. At 1012, decoder 403 evaluates a second condition "if(slice_type!=I && enable_temporal_mvp_flag && ((collocated_from_l0_flag && num_ref_idx_l0_active_minus1>0)|| (!collocated_from_l0_flag && num_ref_idx_l1_active_minus1>0)". If the second condition is true, then at 1014 decoder 403 decodes the syntax collocated_ref_idx in the encoded bitstream. If the second condition is not true, then at 1016 decoder 403 determines that the syntax collocated_ref_idx was not encoded in the encoded bitstream. In this case, decoder 403 may assume the index is the first position (e.g., the position is 0).

At 1018, decoder 403 decodes the current block using the flag collocated_from_l0_flag and the syntax collocated_ref_idx, if applicable.

Accordingly, particular embodiments save overhead by not sending information for the flag collocated_from_l0_flag and the syntax collocated_ref_idx if certain conditions apply. For example, if a temporal MVP is not going to be used, then the flag collocated_from_l0_flag and the syntax collocated_ref_idx do not need to be used.

Encoder and Decoder Examples

Figure 11A:
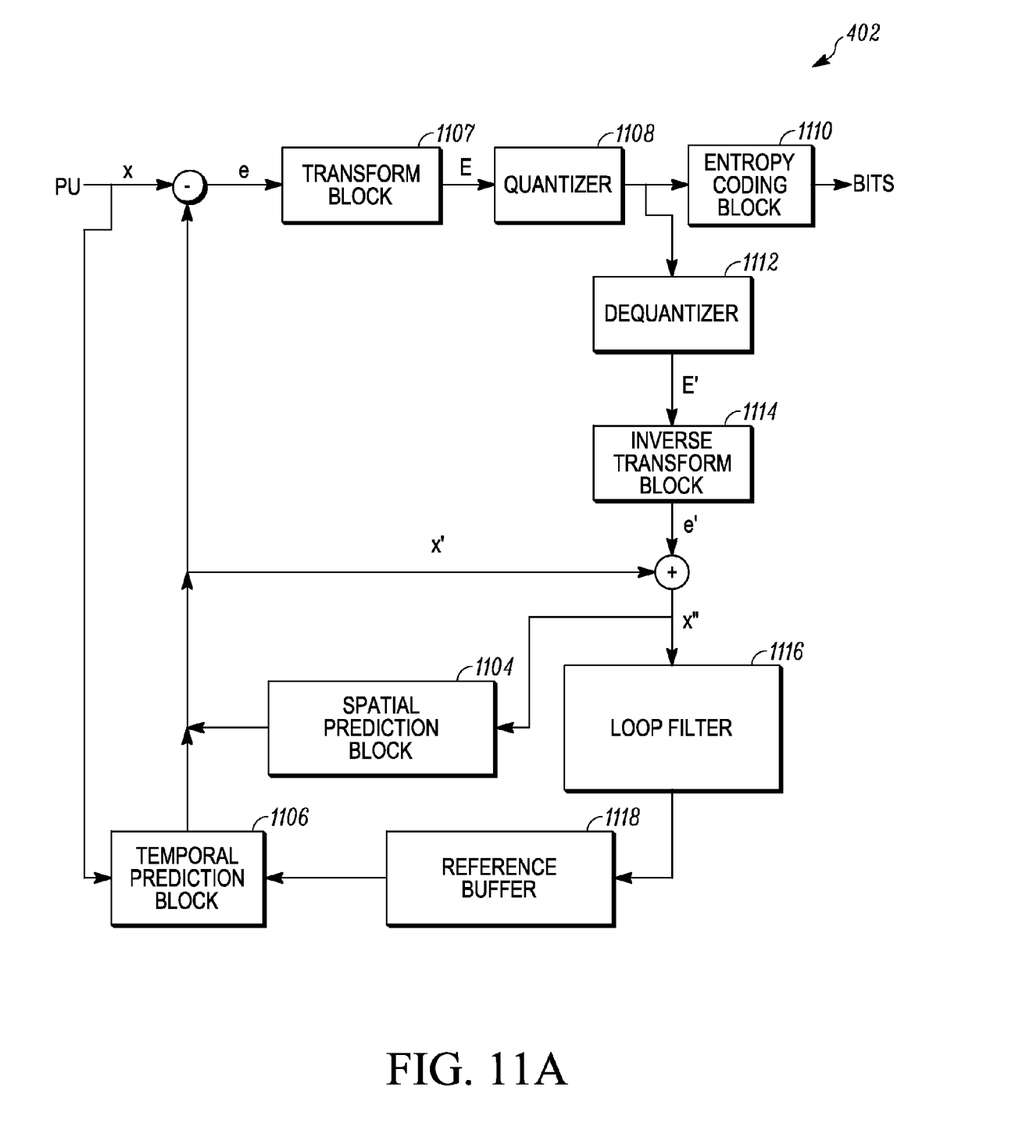
FIG. 11A depicts an example of encoder according to one embodiment.

In various embodiments, encoder 402 described can be incorporated or otherwise associated with a transcoder or an encoding apparatus at a headend and decoder 403 can be incorporated or otherwise associated with a downstream device, such as a mobile device, a set top box or a transcoder. FIG. 11A depicts an example of encoder 402 according to one embodiment. A general operation of encoder 402 will now be described; however, it will be understood that variations on the encoding process described will be appreciated by a person skilled in the art based on the disclosure and teachings herein.

For a current PU, x, a prediction PU, x', is obtained through either spatial prediction or temporal prediction. The prediction PU is then subtracted from the current PU, resulting in a residual PU, e. Spatial prediction relates to intra mode pictures. Intra mode coding can use data from the current input image, without referring to other images, to code an I picture. A spatial prediction block 1104 may include different spatial prediction directions per PU, such as horizontal, vertical, 45-degree diagonal, 135-degree diagonal, DC (flat averaging), and planar, or any other direction. The spatial prediction direction for the PU can be coded as a syntax element. In some embodiments, brightness information (Luma) and color information (Chroma) for the PU can be predicted separately. In one embodiment, the number of Luma intra prediction modes for all block sizes is 35. An additional mode can be used for the Chroma intra prediction mode. In some embodiments, the Chroma prediction mode can be called "IntraFromLuma."

Temporal prediction block 1106 performs temporal prediction. Inter mode coding can use data from the current input image and one or more reference images to code "P" pictures and/or "B" pictures. In some situations and/or embodiments, inter mode coding can result in higher compression than intra mode coding. In inter mode PUs 204 can be temporally predictive coded, such that each PU 204 of the CU 202 can have one or more motion vectors and one or more associated reference images. Temporal prediction can be performed through a motion estimation operation that searches for a best match prediction for the PU over the associated reference images. The best match prediction can be described by the motion vectors and associated reference images. P pictures use data from the current input image and one or more reference images, and can have up to one motion vector. B pictures may use data from the current input image and one or more reference images, and can have up to two motion vectors. The motion vectors and reference pictures can be coded in the encoded bitstream. In some embodiments, the motion vectors can be syntax elements "MV," and the reference pictures can be syntax elements "refIdx." In some embodiments, inter mode can allow both spatial and temporal predictive coding. The best match prediction is described by the motion vector (MV) and associated reference picture index (refIdx). The motion vector and associated reference picture index are included in the coded bitstream.

Transform block 1107 performs a transform operation with the residual PU, e. A set of block transforms of different sizes can be performed on a CU, such that some PUs can be divided into smaller TUs and other PUs can have TUs the same size as the PU. Division of CUs and PUs into TUs 20 can be shown by a quadtree representation. Transform block 1107 outputs the residual PU in a transform domain, E.

A quantizer 1108 then quantizes the transform coefficients of the residual PU, E. Quantizer 1108 converts the transform coefficients into a finite number of possible values. In some embodiments, this is a lossy operation in which data lost by quantization may not be recoverable. After the transform coefficients have been quantized, entropy coding block 1110 entropy encodes the quantized coefficients, which results in final compression bits to be transmitted. Different entropy coding methods may be used, such as context-adaptive variable length coding (CAVLC) or context-adaptive binary arithmetic coding (CABAC).

Also, in a decoding process within encoder 402, a de-quantizer 1112 de-quantizes the quantized transform coefficients of the residual PU. De-quantizer 1112 then outputs the de-quantized transform coefficients of the residual PU, E'. An inverse transform block 1114 receives the de-quantized transform coefficients, which are then inverse transformed resulting in a reconstructed residual PU, e'. The reconstructed PU, e', is then added to the corresponding prediction, x', either spatial or temporal, to form the new reconstructed PU, x". Particular embodiments may be used in determining the prediction, such as collocated reference picture manager 404 is used in the prediction process to determine the collocated reference picture to use. A loop filter 1116 performs de-blocking on the reconstructed PU, x", to reduce blocking artifacts. Additionally, loop filter 1116 may perform a sample adaptive offset process after the completion of the de-blocking filter process for the decoded picture, which compensates for a pixel value offset between reconstructed pixels and original pixels. Also, loop filter 1116 may perform adaptive loop filtering over the reconstructed PU, which minimizes coding distortion between the input and output pictures. Additionally, if the reconstructed pictures are reference pictures, the reference pictures are stored in a reference buffer 1118 for future temporal prediction. Intra mode coded images can be a possible point where decoding can begin without needing additional reconstructed images.

Figure 11B:
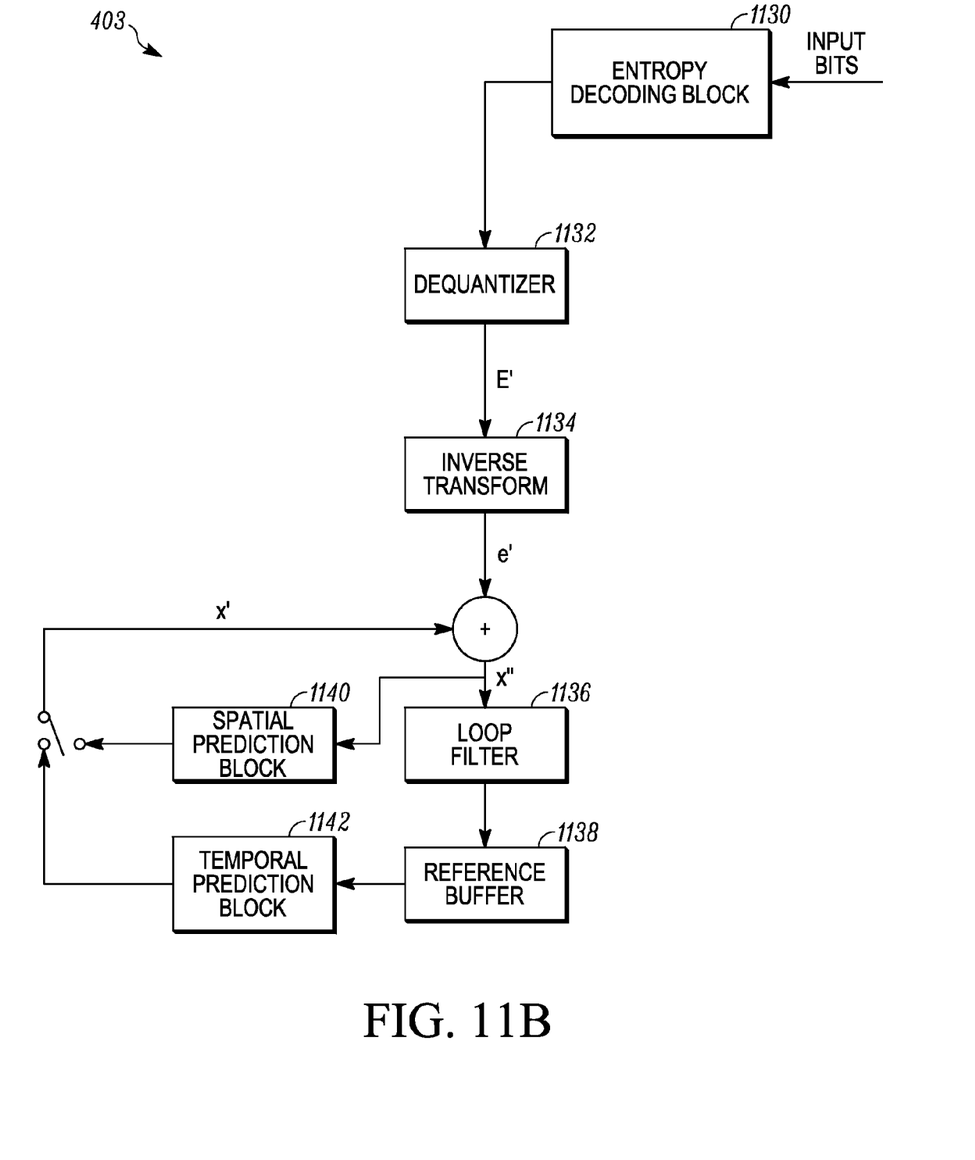
FIG. 11B depicts an example of decoder according to one embodiment.

FIG. 11B depicts an example of decoder 403 according to one embodiment. A general operation of decoder 403 will now be described; however, it will be understood that variations on the decoding process described will be appreciated by a person skilled in the art based on the disclosure and teachings herein. Decoder 403 receives input bits from encoder 402 for encoded video content.

An entropy decoding block 1130 performs entropy decoding on the input bitstream to generate quantized transform coefficients of a residual PU. A de-quantizer 1132 de-quantizes the quantized transform coefficients of the residual PU. De-quantizer 1132 then outputs the de-quantized transform coefficients of the residual PU, E'. An inverse transform block 1134 receives the de-quantized transform coefficients, which are then inverse transformed resulting in a reconstructed residual PU, e'.

The reconstructed PU, e', is then added to the corresponding prediction, x', either spatial or temporal, to form the new reconstructed PU, x". A loop filter 1136 performs de-blocking on the reconstructed PU, x", to reduce blocking artifacts. Additionally, loop filter 1136 may perform a sample adaptive offset process after the completion of the de-blocking filter process for the decoded picture, which compensates for a pixel value offset between reconstructed pixels and original pixels. Also, loop filter 1136 may perform adaptive loop filtering over the reconstructed PU, which minimizes coding distortion between the input and output pictures. Additionally, if the reconstructed pictures are reference pictures, the reference pictures are stored in a reference buffer 1138 for future temporal prediction.

The prediction PU, x', is obtained through either spatial prediction or temporal prediction. A spatial prediction block 1140 may receive decoded spatial prediction directions per PU, such as horizontal, vertical, 45-degree diagonal, 135-degree diagonal, DC (flat averaging), and planar. The spatial prediction directions are used to determine the prediction PU, x'.

A temporal prediction block 1106 performs temporal prediction through a motion estimation operation. Particular embodiments may be used in determining the prediction, such as collocated reference picture manager 404 is used in the prediction process to determine the collocated reference picture to use. A decoded motion vector is used to determine the prediction PU, x'. Interpolation may be used in the motion estimation operation.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing device, a value for a first flag that controls whether a temporal motion vector is used for a slice;
   if the value of the first flag is a first value:
   evaluating, by the computing device, a first condition by determining a prediction type associated with the slice, wherein the first condition indicates that a second flag should be decoded if the prediction type associated with the slice is equal to a B type, the first condition indicates that the second flag should not be decoded if the prediction type is not equal to the B type, and the second flag indicates whether to use a first list containing a first list of reference pictures or a second list containing a second list of reference pictures for determining a collocated reference picture;
   decoding, by the computing device, the second flag in decoding the one or more blocks if the first condition indicates the second flag should be decoded;
   evaluating, by the computing device, a second condition to determine a number of reference pictures in the first list or the second list and whether to decode position information that indicates a position of the collocated reference picture in one of the first list or the second list;
   decoding, by the computing device, the position information in decoding the slice if the second condition indicates that the number of reference pictures in the first list or the second list is greater than one; and
   decoding, by the computing device, the position information in decoding the slice if the second condition indicates the position information should be decoded.

2. The method of claim 1, wherein the prediction type is a slice type.

3. The method of claim 1, wherein evaluating the second condition comprises:
   determining, by the computing device, a prediction type associated with the slice;
   if the prediction type is not equal to an I type:
   evaluating, by the computing device, a third condition to determine whether to decode the position information; and
   respectively decoding, by the computing device, the position information in decoding the slice if the third condition indicates the position information should be decoded.

4. The method of claim 3, further comprising:
   not decoding, by the computing device, the position information in decoding the slice if the prediction type is equal to the I type.

5. The method of claim 3, wherein the prediction type is a slice type.

6. The method of claim 1, wherein:
   the first value indicates that the temporal motion vector should be used in a temporal prediction process decoding the slice, and
   the second value indicates that the temporal motion vector should not be used in the temporal prediction process in decoding the slice.

7. The method of claim 1, wherein the slice includes at least one block.

8. The method of claim 1, further comprising:
   not decoding, by the computing device, the second flag in decoding the one or more blocks if the first condition indicates the second flag should not be decoded;

not decoding, by the computing device, the position information in decoding the slice if the second condition indicates the position information should not be decoded; and not decoding, by the computing device, the position information in decoding the slice if the first flag is a second value.

9. A decoder comprising:
one or more computer processors; and
a non-transitory computer-readable storage medium comprising instructions that, when executed, control the one or more computer processors to be configured for:
determining an encoded bitstream;
determining a value for a first flag that controls whether a temporal motion vector is used for decoding a slice in the encoded bitstream;
if the value of the first flag is a first value:
evaluating a first condition by determining a prediction type associated with the slice, wherein the first condition indicates that a second flag should be decoded if the prediction type associated with the slice is equal to a B type, the first condition indicates that the second flag should not be decoded if the prediction type is not equal to the B type, and the second flag that indicates whether to decode a first list containing a first list of reference pictures or a second list containing a second list of reference pictures for determining a collocated reference picture;
decoding the second flag in the encoded bitstream for use in decoding the slice if the first condition indicates the second flag should be decoded;
evaluating a second condition to determine a number of reference pictures in the first list or the second list and whether to decode position information that indicates a position that contains the collocated reference picture in one of the first list or the second list; and
decoding the position information in decoding the slice if the second condition indicates that the number of reference pictures in the first list or the second list is greater than one; and
decoding the position information in the encoded bitstream for use in decoding the slice if the second condition indicates the position information should be decoded.

10. The decoder of claim 9, wherein evaluating the first condition comprises:
determining a prediction type associated with the slice; and
decoding the second flag in decoding the slice if the prediction type is equal to a B type.

11. The decoder of claim 10, wherein the prediction type comprises a slice type, further comprising:
not decoding the second flag in the temporal prediction process in decoding the slice if the slice type is not equal to the B type.

12. The decoder of claim 9, wherein evaluating the second condition comprises:
determining a prediction type associated with the slice;
if the prediction type is not equal to an I type:
evaluating a third condition to determine whether to decode the position information; and
decoding the position information in decoding the slice if the third condition indicates the position information should be decoded.

13. The decoder of claim 12, further comprising:
not decoding the position information in decoding the slice if the prediction type is equal to the I type.

14. The decoder of claim 9, further comprising:
not decoding the second flag in decoding the one or more blocks if the first condition indicates the second flag should not be decoded;
not decoding the position information in decoding the slice if the second condition indicates the position information should not be decoded; and
not decoding the position information in decoding the slice if the first flag is a second value.

15. An encoder comprising:
one or more computer processors; and
a non-transitory computer-readable storage medium comprising instructions that, when executed, control the one or more computer processors to be configured for:
determining a value for a first flag that controls whether a temporal motion vector is used for encoding a slice;
if the value of the first flag is a first value:
evaluating a first condition by determining a prediction type associated with the slice, wherein the first condition indicates that a second flag should be encoded if the prediction type associated with the slice is equal to a B type, the first condition indicates that the second flag should not be encoded if the prediction flag type is not equal to the B type, and the second flag indicates whether to use a first list containing a first list of reference pictures or a second list containing a second list of reference pictures for determining a collocated reference picture;
encoding a value for the second flag in encoding the slice if the first condition indicates the second flag should be encoded;
evaluating a second condition to determine a number of reference pictures in the first list or the second list and whether to encode position information that indicates a position that contains the collocated reference picture in one of the first list or the second list;
encoding the position information in encoding the slice if the second condition indicates that the number of reference pictures in the first list or the second list is greater than one; and
encoding the position information in the encoded bitstream in the temporal prediction process in encoding the slice if the second condition indicates the position information should be encoded.

16. The encoder of claim 15, wherein evaluating the first condition comprises:
determining a prediction type associated with the slice; and
encoding the second flag in encoding the slice if the prediction type is equal to a B type.

17. The encoder of claim 16, wherein the prediction type comprises a slice type, and further comprising:
not encoding the second flag in encoding the slice if the slice type is not equal to the B type.

18. The encoder of claim 15, wherein evaluating the second condition comprises:
determining a prediction type associated with the slice;
if the prediction type is not equal to an I type:
evaluating a third condition to determine whether to encode the position information; and
encoding the position information in encoding the slice if the third condition indicates the position information should be encoded.

19. The encoder of claim 18, further comprising:
not encoding the position information in encoding the slice if the prediction type is equal to the I type.

20. The encoder of claim 15, further comprising:
not encoding the second flag in encoding the one or more blocks if the first condition indicates the second flag should not be encoded;
not encoding the position information in encoding the slice if the second condition indicates the position information should not be encoded; and
not encoding the position information in encoding the slice if the first flag is a second value.

\* \* \* \* \*